United States Patent [19]

Isaoka et al.

[11] 3,957,904

[45] May 18, 1976

[54] POLYMERIC FLOCCULANT COMPOSITION

[75] Inventors: Shin-ichi Isaoka, Kyoto; Tutomu Shintani, Toyonaka; Mamoru Suzuki, Takarazuka; Wataru Tohma, Yamatotakada, all of Japan

[73] Assignee: Sumitomo Chemical Company, Limited, Japan

[22] Filed: May 9, 1974

[21] Appl. No.: 468,273

[30] Foreign Application Priority Data

May 9, 1973 Japan.................................. 48-51916

[52] U.S. Cl................................. 260/856; 210/51; 260/29.4 UA; 260/851
[51] Int. Cl.² ...................... C02B 1/20; C08L 61/28
[58] Field of Search............................. 260/851, 856

[56] References Cited
UNITED STATES PATENTS

| | | |
|---|---|---|
| 2,862,901 | 12/1958 | Suen et al. ............................ 260/851 |
| 2,918,386 | 12/1959 | Wooding............................. 260/851 |
| 3,340,237 | 9/1967 | Sellet.................................. 260/851 |
| 3,405,003 | 10/1968 | DePaolo et al. ..................... 260/851 |
| 3,509,021 | 4/1970 | Woodward.......................... 260/851 |
| 3,699,112 | 10/1972 | Konishi et al....................... 260/851 |

FOREIGN PATENTS OR APPLICATIONS 1,642,806  4/1971  Germany

*Primary Examiner*—John C. Bleutge
*Attorney, Agent, or Firm*—Stewart and Kolasch, Ltd.

[57] ABSTRACT

A polymeric flocculant composition having an excellent flocculation effect, which comprises (a) an acrylamide polymer containing 50 or more molar % of an acrylamide unit and (b) at least one amino resin precondensate selected from the group consisting of urea-formaldehyde, melamine-formaldehyde, guanidine-formaldehyde and dicyandiamide-formaldehyde, wherein the acrylamide polymer and the amino resin precondensate are admixed in a ratio of 90 : 10 to 99 : 1 by weight. The polymeric flocculant composition disclosed herein is useful for cleaning waste water.

6 Claims, No Drawings

POLYMERIC FLOCCULANT COMPOSITION

The present invention relates to a polymeric flocculant composition comprising acrylamide polymers. More particularly, it relates to a novel polymeric flocculant composition having a highly improved flocculation effect which comprises an acrylamide polymer containing 50 or more molar % of an acrylamide unit and a small amount of an amino resin precondensate.

Recently, the water pollution caused by mainly industrial waste water has become an important social problem and it has become essential to clean up such waste water. Polymeric flocculants have been used for cleaning the waste water by the effect of flocculating the suspended particles. The polymeric flocculants can reduce the degree of color, BOD (biochemical oxygen demand), COD (chemical oxygen demand) as well as turbidity, and therefore the demand therefor has promptly increased. Particularly, a water soluble polymer having a high degree of polymerization which comprises predominantly a polyacrylamide has been mainly used as a polymeric flocculant because it shows an excellent flocculation effect in a small amount. The polymeric flocculant comprising a polyacrylamide is usually sold in a form of the powder product or a liquid product. The liquid product is usually a 5 –10 % aqueous solution because the high concentration product is so viscous, but it has defects in its low storage stability and high expense for the transportation thereof. Accordingly, it has mainly been sold in the form of a powder product. When the powder product is used, it is previously dissolved in water so as to provide a concentration of about 0.1 to 1.0%, and then the aqueous solution is added to the waste water to be treated.

However, the conventional polymeric flocculant comprising a polyacrylamide should be used in a comparatively large amount of a resin for achieving the sufficient flocculation effect, and this is disadvantageous not only from the viewpoint of the high cost but also for the reason that the addition of a large amount of the high polymeric substance causes inhibition of the dewatering and filtration of the primarily flocculated sludge.

Under the circumstances, studies have been conducted to find a novel polymeric flocculant composition having an excellent flocculation effect in a small amount, and it has now been found that an excellent polymeric flocculant can be obtained by mixing an acrylamide containing 50 or more % by mol of an acrylamide unit and a small amount of an amino resin precondensate.

An object of the present invention is to provide a novel polymeric flocculant composition comprising predominantly an acrylamide polymer and a small amount of an amino resin precondensate.

Another object of the invention is to provide a polymeric flocculant composition which is useful in a small amount.

A further object of the invention is to provide a process for producing a polymeric flocculant composition having an excellent flocculation effect and which is excellently stable.

A still further object of the invention is to provide a process for treating waste water with the composition as set forth above.

These and other objects will be apparent from the description hereinafter.

The polymeric flocculant composition of the present invention comprises (a) an acrylamide polymer containing 50 or more % by mol of an acrylamide unit and (b) at least one amino resin precondensate selected from the group consisting of urea-formaldehyde, melamine-formaldehyde, guanidine-formaldehyde and dicyandiamide-formaldehyde, wherein the acrylamide polymer and the amino resin precondensate are admixed in a ratio of 90 : 10 to 99 : 1 by weight.

The polyacrylamide or acrylamide polymer used in the present invention may preferably contain 50 to 100 % by mole of an acrylamide unit, and the suitable examples thereof include a nonionic polymer [e.g. a polyacrylamide, or a copolymer of acrylamide with acrylonitrile as described in Faserforsch Textiltech., Vol. 5, page 204 (1954), or with methacrylamide as described in Trans. Faraday Soc., Vol. 59, page 1385 (1963), or with styrene as described in J. Polymer Sci., Vol. 11, page 3037 (1973)], an anionic polymer [e.g. a copolymer of acrylamide with a sodium, potassium or ammonium salt of acrylic acid, for example, Sumifloc FA (a trademark of Sumitomo Chemical Company, Limited), or with a salt of vinylsulfonic acid, for example, Sumifloc FN-S (a trademark of Sumitomo Chemical Company, Limited), or with a salt of itaconic acid as described in Japanese Patent Opening No. 22145/1973], and a cationic polymer [e.g. a cationicly modified polyacrylamide, for example, Sumifloc FC-50 (a trademark of Sumitomo Chemical Company, Limited), or a copolymer of acrylamide with a dialkylaminoethyl acrylate, for example, Hercofloc (a trademark of Hercules Inc.), or with vinylpyridine as described in Japanese Patent Publication No. 9576/1973]. The acrylamide polymer may have about 10 to about 30, preferably 15 to 25, of an intrinsic viscosity $[\eta]$ in 1N $NaNO_3$, which is used as a criterion of the degree of polymerization.

The amino resin precondensate used in the invention includes a water soluble precondensate having a methylol or methoxymethyl group, and having a molecular weight of about 100 to about 1,000, such as a urea-formaldehyde precondensate, for example, Sumitex Resin ULW (a trademark of Sumitomo Chemical Company, Limited), a melamine-formaldehyde precondensate, for example, Sumirez resin 607 (a trademark of Sumitomo Chemical Company, Limited), a guanidine-formaldehyde precondensate as described in U.S. Pat. No. 2,872,355 and a dicyandiamide-formaldehyde precondensate, for example, Sumiset D (a trademark of Sumitomo Chemical Company, Limited).

In the present invention, preferred compositions are ones comprising the said anionic polymer and the said melamine-formaldehyde or dicyandiamide-formaldehyde precondensate. The present composition may be in the form of a powder or an aqueous solution.

The mixture ratio of the acrylamide polymer and the amino resin precondensate may vary depending upon the content of acrylamide component in the polymer and the degree of polycondensation and the molecular weight of the amino resin, but may preferably be in a range of [acrylamide polymer] : [amino resin precondensate] of 90 : 10 to 99 : 1 by weight.

When the addition amount of the amino resin precondensate is less than 1 % by weight, the flocculation effect of the product can not sufficiently be exhibited, and on the other hand, when it is over 10 % by weight, the intrinsic viscosity $[\eta]$ of the product inclines to decrease and occasionally it becomes water-insoluble.

According to the preferred embodiment of the present invention, the desired product may be preferably produced by admixing a powdery acrylamide polymer and a powdery amino resin precondensate in the optimum ratio as above-mentioned by using a mixer or the like, by which a very stable composition may be obtained.

When the composition of the present invention is used as a flocculant, it may preferably be dissolved in or diluted with water so as to provide a concentration of about 0.1 to 1.0% by weight with mild agitation, in which the time for the dissolution or dilution may be about 2 to 5 hours, and the aqueous solution thus obtained may be added to the waste water to be treated. The amount of the present composition to be added depends on the solid concentration of the waste water (slurry or sludge), and may usually be 0.1 to 10 ppm based on the waste water. The present polymeric flocculant composition may be also used in the same manner as the conventional polymeric flocculants comprising a polyacrylamide, for example, in the manner described in Japanese Patent Publication No. 501/1957.

The polymeric flocculant composition of the present invention is effective for not only increasing the flocculation of the suspended particles and precipitation thereof but also improving the dewatering and filtration of the flocculated sludge, and further occasionally improving the decoloration effect. Accordingly, the present polymeric flocculant composition is extremely valuable as an industrial and economical flocculant.

The present invention is illustrated by the following examples but is not limited thereto.

EXAMPLE 1

To a copolymer of acrylamide and sodium acrylate (molar ratio; 85 : 15, Sumifloc FA-40) was mixed a melamine resin (Sumirez resin 607: trademark of a melamine resin made by Sumitomo Chemical Company, Limited) so as to form each composition containing 1, 3 or 5 % by weight of the melamine resin and thereto was added water, and the mixture was slowly agitated to give an aqueous solution having a concentration of 0.1 % by weight.

The intrinsic viscosity of the solution thus obtained was measured at 30°C. The results are shown in Table 1.

For measuring the flocculation effect of the solution, the solution obtained above (2.0 ppm, calculated as the composition based on a slurry to be treated) was added to an aqueous slurry (pH 4.5) containing 2 % by weight of diatomaceous earth, and then the sedimentation rate and the permeability rate were measured. The results are also shown in Table 1.

Table 1

| Content of melamine resin (% by weight) | Intrinsic viscosity $[\eta]$ (at 30°C. in 1N $NaNO_3$) | Flocculation effect | |
|---|---|---|---|
| | | Sedimentation rate (cm/minute) | Permeability rate (%) |
| 0 (Control) | 21.2 | 13.0 | 63 |
| 1 | 22.2 | 15.0 | 64 |
| 3 | 24.3 | 23.0 | 66 |
| 5 | 22.3 | 20.0 | 60 |

EXAMPLE 2

To a copolymer of acrylamide and sodium acrylate (molar ratio; 85 : 15, Sumifloc FA-40) was added the same melamine resin as in Example 1 so as to form each composition containing 2 or 5 % by weight of the melamine resin and thereto was added water, and the mixture was slowly agitated to give an aqueous solution having a concentration of 0.1 % by weight.

The flocculation effect of the solution was measured in the same manner as in Example 1. The results are shown in Table 2.

Table 2

| Content of melamine resin (% by weight) | Flocculation effect | |
|---|---|---|
| | Sedimentation rate (cm/minute) | Permeability rate (%) |
| 0 (Control) | 52.4 | 80 |
| 2 | 53.1 | 85 |
| 5 | 57.6 | 86 |

EXAMPLE 3

To a copolymer of acrylamide and sodium acrylate (molar ratio; 85 : 15, Sumifloc FA-40) was added a guanidine-formaldehyde precondensate so as to form each composition containing 2.5, 5, or 10 % by weight of the precondensate. The mixture was treated in the same manner as in Example 1 and the intrinsic viscosity and the flocculation effect were measured in the same manner as in Example 1. The results are shown in Table 3.

Table 3

| Content of guanidine resin (% by weight) | Intrinsic viscosity $[\eta]$ (at 30°C, in 1N $NaNO_3$) | Flocculation effect | |
|---|---|---|---|
| | | Sedimentation rate (cm/minute) | Permeability rate (%) |
| 0 (Control) | 21.0 | 20.0 | 65 |
| 2.5 | 23.0 | 35.0 | 66 |
| 5 | 22.5 | 30.5 | 64 |
| 10 | 21.2 | 21.0 | 60 |

EXAMPLE 4

To a cationicly modified polyacrylamide (cation value in modification by the Mannich reaction: 20 %, Sumiflock FC-50) was added the same melamine resin as in Example 1 so as to form each composition containing 5, 10 or 20 % by weight of the precondensate and thereto was added water, and the mixture was slowly agitated to give an aqueous solution having a concentration of 0.1 % by weight.

The intrinsic viscosity of the solution thus obtained was measured at 30°C. The results are shown in Table 4.

For measuring the flocculation effect of the solution, the solution obtained above (2.0 ppm, calculated as the composition based on a slurry to be treated) was added to an aqueous slurry (pH 3.0) containing 2 % by weight of kaolin, and then the sedimentation rate and permeability rate were measured. The results are also shown in Table 4.

Table 4

| Content of melamine resin (% by weight) | Intrinsic viscosity [η] (at 30°C, in 1N NaNO$_3$) | Flocculation efffect | |
|---|---|---|---|
| | | Sedimentation rate (cm/minute) | Permeability rate (%) |
| 0 (Control) | 10.0 | 20.2 | 88.0 |
| 5 | 13.0 | 35.0 | 80.0 |
| 10 | 12.3 | 30.0 | 82.0 |
| 20 | 8.5 | 15.0 | 90.5 |

EXAMPLE 5

To a copolymer of acrylamide and sodium acrylate (molar ratio; 80 : 20, Sumifloc FA-50) was added the same melamine resin as in Example 1 so as to form each composition containing 5 or 10 % by weight of the melamine resin, and the mixture was treated in the same manner as described in Example 1. The viscosity and the flocculation effect of the solution thus obtained were measured in the same manner as in Example 1. The results are shown in Table 5.

Table 5

| Content of melamine resin (% by weight) | Intrinsic viscosity [η] (at 30°C, in 1N NaNO$_3$) | Flocculation effect | |
|---|---|---|---|
| | | Sedimentation rate (cm/minute) | Permeability rate (%) |
| 0 (Control) | 20.0 | 15.0 | 65 |
| 5 | 23.0 | 25.5 | 67 |
| 10 | 22.5 | 24.0 | 66 |

EXAMPLE 6

In the same manner as in Example 1, an aqueous solution of a flocculant composition was produced. The solution thus obtained (3.0 ppm or 4.0 ppm, calculated as the composition based on a slurry to be treated) was added to an aqueous slurry (pH 4.5) containing 2 % by weight of diatomaceous earth, and then the sedimentation rate and the permeability rate were measured. The results are shown in Table 6.

Table 6

| Addition amount of the aqueous solution (calculated as composition) (ppm) | Content of melamine resin (% by weight) | Flocculation effect | |
|---|---|---|---|
| | | Sedimentation rate (cm/minute) | Permeability rate (%) |
| | 0 (Control) | 30.2 | 75.5 |
| 3.0 | 3 | 34.8 | 77.8 |
| | 5 | 33.1 | 76.3 |
| | 0 (Control) | 35.2 | 80.6 |
| 4.0 | 3 | 44.2 | 83.6 |
| | 5 | 39.5 | 82.4 |

What is claimed is:

1. A polymeric flocculant composition comprising (a) an anionic copolymer of acrylamide with a sodium, potassium or ammonium salt of acrylic acid in a molar ratio of 85 : 15 to 80 : 20 and (b) a melamine-formaldehyde precondensate, the anionic acrylamide copolymer and the melamine-formaldehyde precondensate being admixed in a ratio of 95 : 5 to 99 : 1 by weight.

2. The polymeric flocculant composition according to claim 1, wherein said anionic acrylamide copolymer has an intrinsic viscosity in 1N NaNO$_3$ of 10 or more.

3. The polymeric flocculant composition according to claim 1, wherein the composition is an aqueous solution having a concentration of about 0.1 to 1.0% by weight.

4. The polymeric flocculant composition according to claim 1, wherein the composition is in powder form.

5. The polymeric flocculant composition according to claim 1, wherein said melamine-formaldehyde precondensate has a molecular weight of about 100 to about 1000.

6. The polymeric flocculant composition according to claim 1, wherein said anionic acrylamide copolymer has an intrinsic viscosity in 1N NaNO$_3$ of about 10 to about 30.

* * * * *